(12) United States Patent
Sip

(10) Patent No.: US 8,648,827 B2
(45) Date of Patent: Feb. 11, 2014

(54) PORTABLE DEVICES, DATA TRANSMISSION SYSTEMS AND DISPLAY SHARING METHODS THEREOF

(75) Inventor: Kim Yeung Sip, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 189 days.

(21) Appl. No.: 13/276,795

(22) Filed: Oct. 19, 2011

(65) Prior Publication Data

US 2012/0242596 A1 Sep. 27, 2012

(30) Foreign Application Priority Data

Mar. 23, 2011 (TW) .............................. 100109939 A

(51) Int. Cl.
*G06F 3/041* (2006.01)
(52) U.S. Cl.
USPC .............. 345/173; 345/1.1; 345/1.3; 715/863
(58) Field of Classification Search
USPC ............ 345/1.1, 1.3, 169, 173; 715/751, 761, 715/863; 455/41.2, 566
See application file for complete search history.

(56) References Cited

U.S. PATENT DOCUMENTS

| | | | | |
|---|---|---|---|---|
| 2005/0093868 | A1* | 5/2005 | Hinckley ...................... | 345/502 |
| 2011/0231783 | A1* | 9/2011 | Nomura ........................ | 715/761 |
| 2012/0105346 | A1* | 5/2012 | Chen et al. ................... | 345/173 |
| 2012/0206319 | A1* | 8/2012 | Lucero et al. ................. | 345/1.3 |

FOREIGN PATENT DOCUMENTS

| | | |
|---|---|---|
| WO | WO 2005/065180 | 7/2005 |
| WO | WO 2010/028406 | 3/2010 |

OTHER PUBLICATIONS

European Search Report dated Feb. 19, 2013.

* cited by examiner

*Primary Examiner* — Koosha Sharifi-Tafreshi
(74) *Attorney, Agent, or Firm* — McClure, Qualey & Rodack, LLP

(57) ABSTRACT

Display sharing methods for use in a server coupled to a plurality of devices via a network are provided. Each device at least includes a touch-sensitive display unit. The server receives a plurality of determination information from the devices and determines whether the devices corresponding to the received determination information are neighboring to each other and are located on the same plane, wherein each of determination information corresponds to one device and includes first gesture information. If so, the server further determines whether first gesture information from all received determination information can be combined into a closed-loop gesture and if so, provides first display data to each device. Second display information is displayed on the touch-sensitive display units of the devices, wherein each of determination information is generated when the corresponding device detects/receives a gesture which has contacted two edges of its touch-sensitive display unit on the touch-sensitive display unit.

14 Claims, 13 Drawing Sheets

PORTABLE DEVICES, DATA TRANSMISSION SYSTEMS AND DISPLAY SHARING METHODS THEREOF

CROSS REFERENCE TO RELATED APPLICATIONS

This Application claims priority of Taiwan Patent Application No. 100109939, filed on Mar. 23, 2011, the entirety of which is incorporated by reference herein.

BACKGROUND OF THE INVENTION

1. Field of the Invention

The disclosure relates generally to portable devices, data transmission systems and related display sharing methods, and, more particularly to portable devices, data transmission systems and related display sharing methods capable of performing data sharing among multiple devices which are neighboring to each other and are located on the same plane.

2. Description of the Related Art

Recently, electronic devices such as portable devices and handheld devices, such as mobile phones, smart phones or PDAs (Personal Digital Assistants), have become more and more technically advanced and multifunctional. Because of the conveniences of these devices, the devices have become necessities of life.

For some handheld devices, such as smart phones, PDAs, tablet PCs and so on, a touch screen which is directly touchable may be provided as a main input device for users to control functions thereof. Users of the handheld devices can slide their fingers to touch the items displayed by the touch screen to issue a command, and perform or control operations corresponding to the selected items. For example, users can click on a drawing button or icon displayed on the touch screen to activate a drawing function, or can click on a navigation button or icon displayed on the touch screen to activate a GPS navigation function.

As user requirements and behaviors change, more and more portable devices further support gesture recognition capability to provide a number of specific gestures for users to control some specific functions. For example, in some multimedia applications, users can control the playing of music or video files by a number of simple gesture (such as a gesture that has swept between left and right on the touch screen). Generally, currently provided gesture recognition can only be performed on a single device and used to control the operation of the single device. No more further functions for the gesture recognition can be provided.

Moreover, Touch-sensitive display units of portable devices or handheld devices are typically configured with a fixed small size panel due to the cost and convenience in carry consideration. When the size of the data to be displayed is larger than the panel size, however, the data to be display must be resized to match to the panel size to be able to be displayed thereon, resulting in inconveniencing in use.

BRIEF SUMMARY OF THE INVENTION

Portable devices, data transmission methods and display sharing methods thereof are provided to provide data sharing among a plurality of neighboring devices which are located on the same plane.

In an embodiment of a display sharing method for use in a server which is coupled to a plurality of devices via a network, the server first receives a plurality of determination information from the devices, wherein each of the determination information corresponds to one of the devices and comprises first gesture information. Thereafter, the server determines whether all of the devices that the determination information correspond to are neighboring to each other and are located on the same plane according to the determination information. When determining that all of the devices that the determination information correspond to are closed to each other and are located on the same plane, the server further determines whether the first gesture information from all of the determination information can be combined into a closed-loop gesture, and when determining that the first gesture information from all of the determination information can be combined into the closed-loop gesture, provides each of the devices with a first display data such that a second display data is jointly displayed on the touch-sensitive display units of the devices. Each of the determination information is generated when the corresponding device detects/receives a gesture which has contacted two edges of the touch-sensitive display unit of the corresponding device on the touch-sensitive display unit.

An embodiment of a data transmission system comprises a plurality of devices and a server. Each of the devices at least comprises a touch-sensitive display unit. The server which is coupled to the devices via a network receives a plurality of determination information from the devices, wherein each of the determination information corresponds to one of the devices and comprises first gesture information, determines whether all of the devices that the determination information correspond to are neighboring to each other and are located on the same plane according to the determination information, determines whether the first gesture information from all of the determination information can be combined into a closed-loop gesture when determining that all of the devices that the determination information correspond to are closed to each other and are located on the same plane, and when determining that the first gesture information from all of the determination information can be combined into the closed-loop gesture, provides each of the devices with a first display data such that a second display data is jointly displayed on the touch-sensitive display units of the devices. Each of the determination information is generated when the corresponding device detects/receives a gesture which has contacted two edges of the touch-sensitive display unit of the corresponding device on the touch-sensitive display unit.

Another embodiment of a portable device at least comprises a touch-sensitive display unit and a processing unit. The processing unit detects a gesture which has contacted two edges of the touch-sensitive display unit on the touch-sensitive display unit, generates determination information according to the gesture which has contacted the two edges of the touch-sensitive display unit, transmits the determination information to a server via a network, determines whether a confirmation message from the server has been received within a predetermined period of time, and receives and displays first display data transmitted by the server when receiving the confirmation message from the server during the predetermined period of time to jointly display second display data on touch-sensitive display units of a plurality devices which are neighboring to each other and the portable device and are located on the same plane as the portable device, wherein the first display data is a specific portion of the second display data.

Display sharing methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
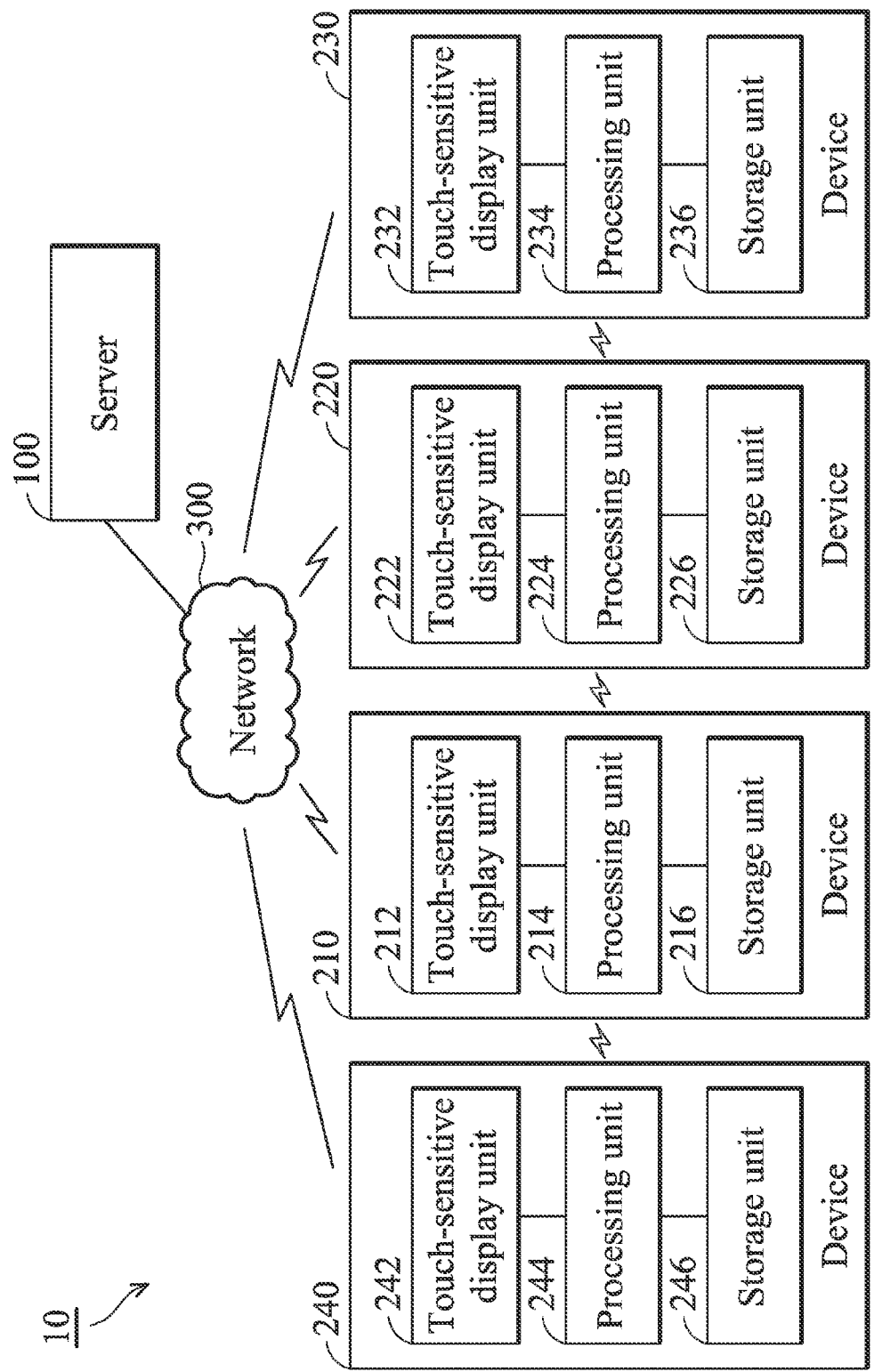
FIG. 1 is a schematic diagram illustrating an embodiment of a data transmission system of the invention.

FIG. 1 is a schematic diagram illustrating an embodiment of a data transmission system of the invention. The data transmission system 10 of the invention at least comprises a sever 100 and a plurality of devices 210-240, wherein all of the devices 210-240 are located within a specific area, and are communicated with each other through a network 300 or a wireless communication protocol, such as an infra-red (IR) or Bluetooth protocol and so on. The devices 210-240 may be electronic device with the same type or electronic devices with different types, such as a smart phone, a PDA (Personal Digital Assistant), a laptop computer or a tablet computer.

Each of the devices 210-240 may at least comprise a touch-sensitive display unit, a processing unit and a storage unit. To be more specific, the device 210 may at least comprise a touch-sensitive display unit 212, a processing unit 214 and a storage unit 216. The touch-sensitive display unit 212 may be integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. The touch-sensitive display unit 212 can display related data, such as texts, figures, interfaces, and/or information. The storage unit 216 stores at least one file and a number of gesture recognition data. The gesture recognition data within the storage unit 216 may further be provided to the processing unit 214 for subsequent determination of the type of inputted gesture. The processing unit 214 which is coupled to the touch-sensitive display unit 212 can perform the display sharing method of the present invention, which will be discussed further in the following paragraphs.

Similarly, the device 220 may at least comprise a touch-sensitive display unit 222, a processing unit 224 and a storage unit 226, the device 230 may at least comprise a touch-sensitive display unit 232, a processing unit 234 and a storage unit 236, and the device 240 may at least comprise a touch-sensitive display unit 242, a processing unit 244 and a storage unit 246, wherein the size of the display areas formed by the touch-sensitive display units 212, 222, 232 and 242 may be the same or different from each other.

All of the devices 210-240 are connected to the network 300 and may transmit data to or receive data from the network 300. The network 300 further includes a server 100, wherein the server 100 can perform the display sharing method of the present invention, which will be discussed further in the following paragraphs.

Figure 2A:
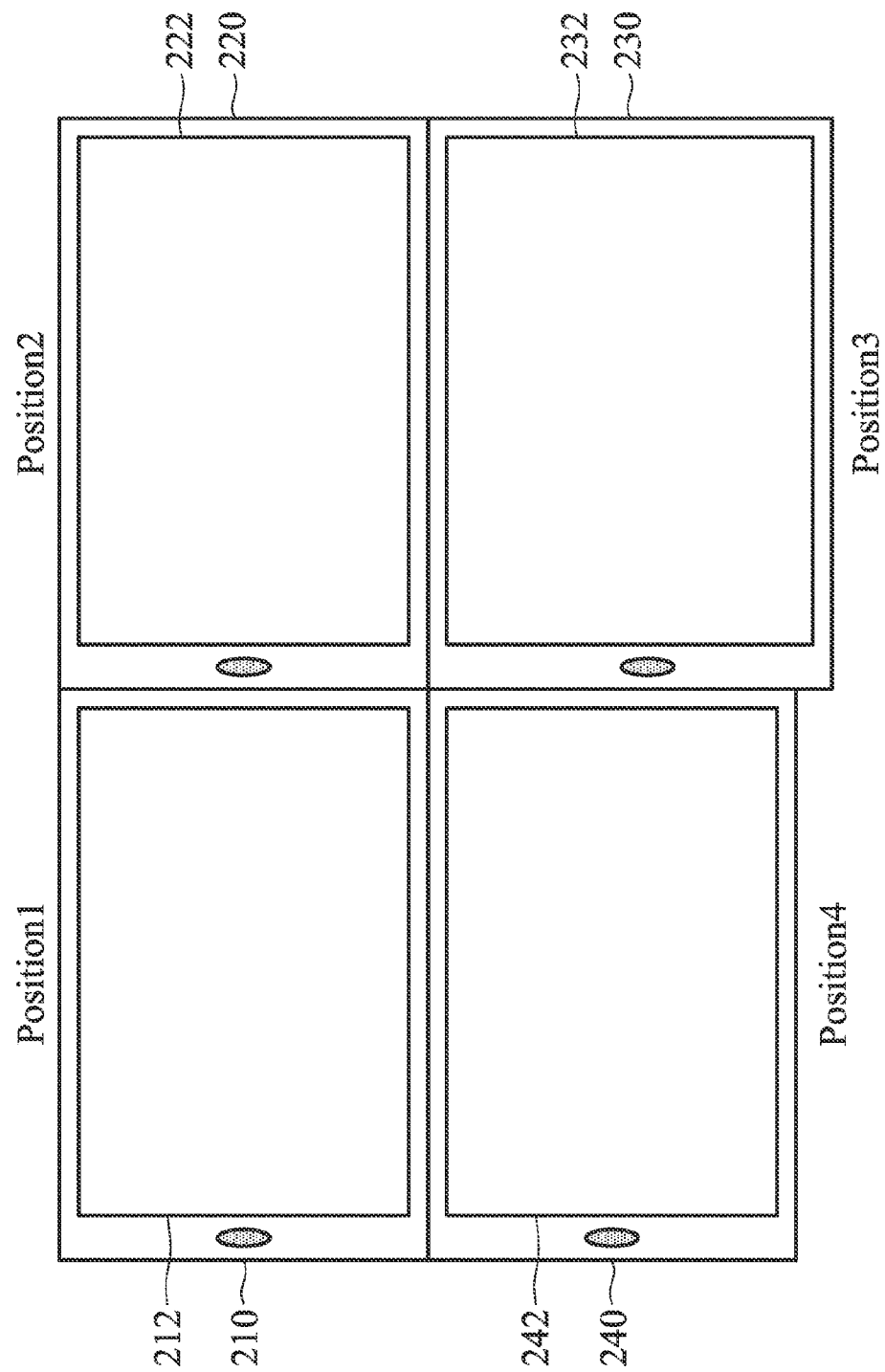
FIGS. 2A to 2D are schematic diagrams illustrating an embodiment of operations of the display sharing method of the invention.
Figure 2B:
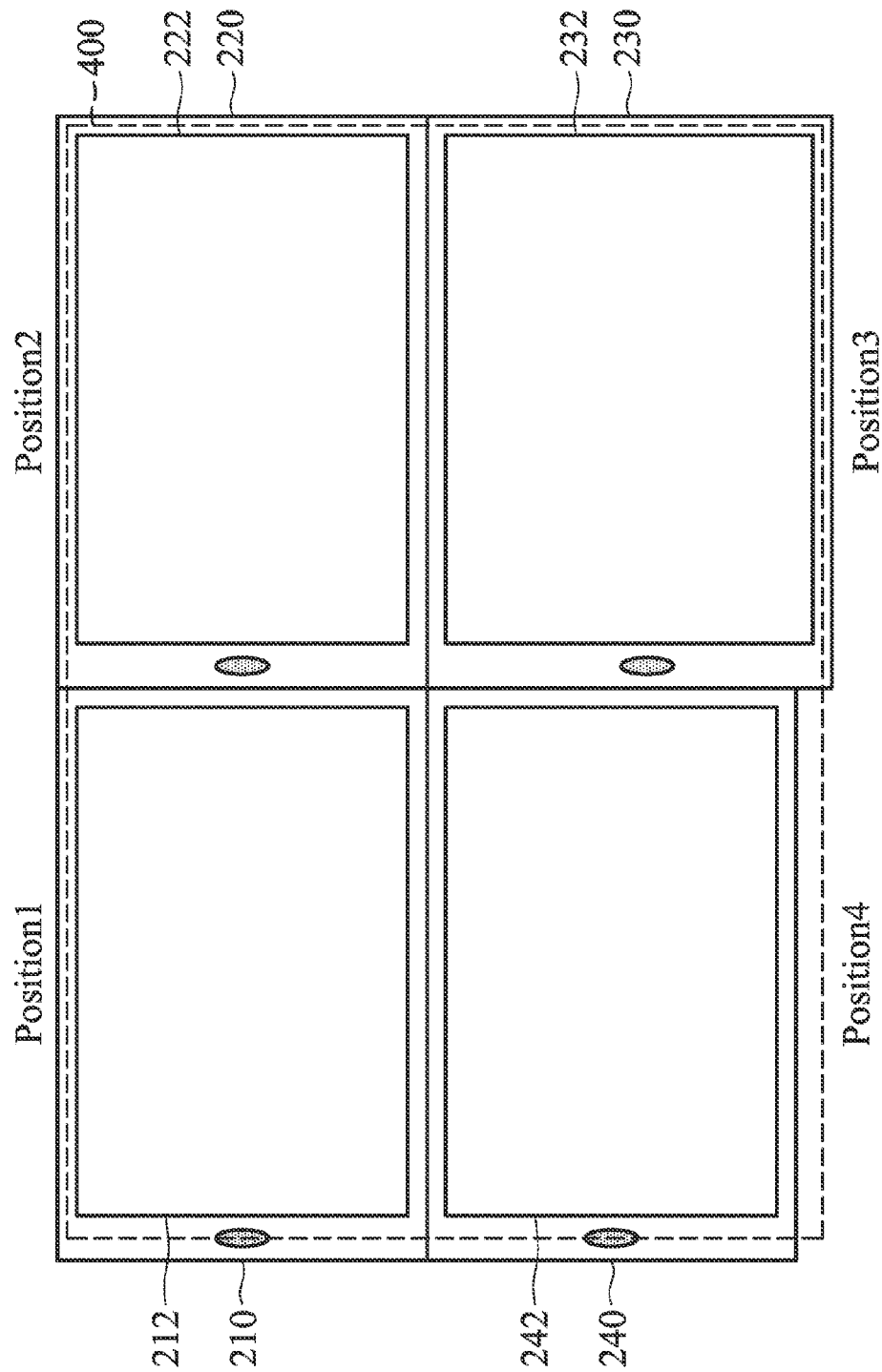
Figure 2C:
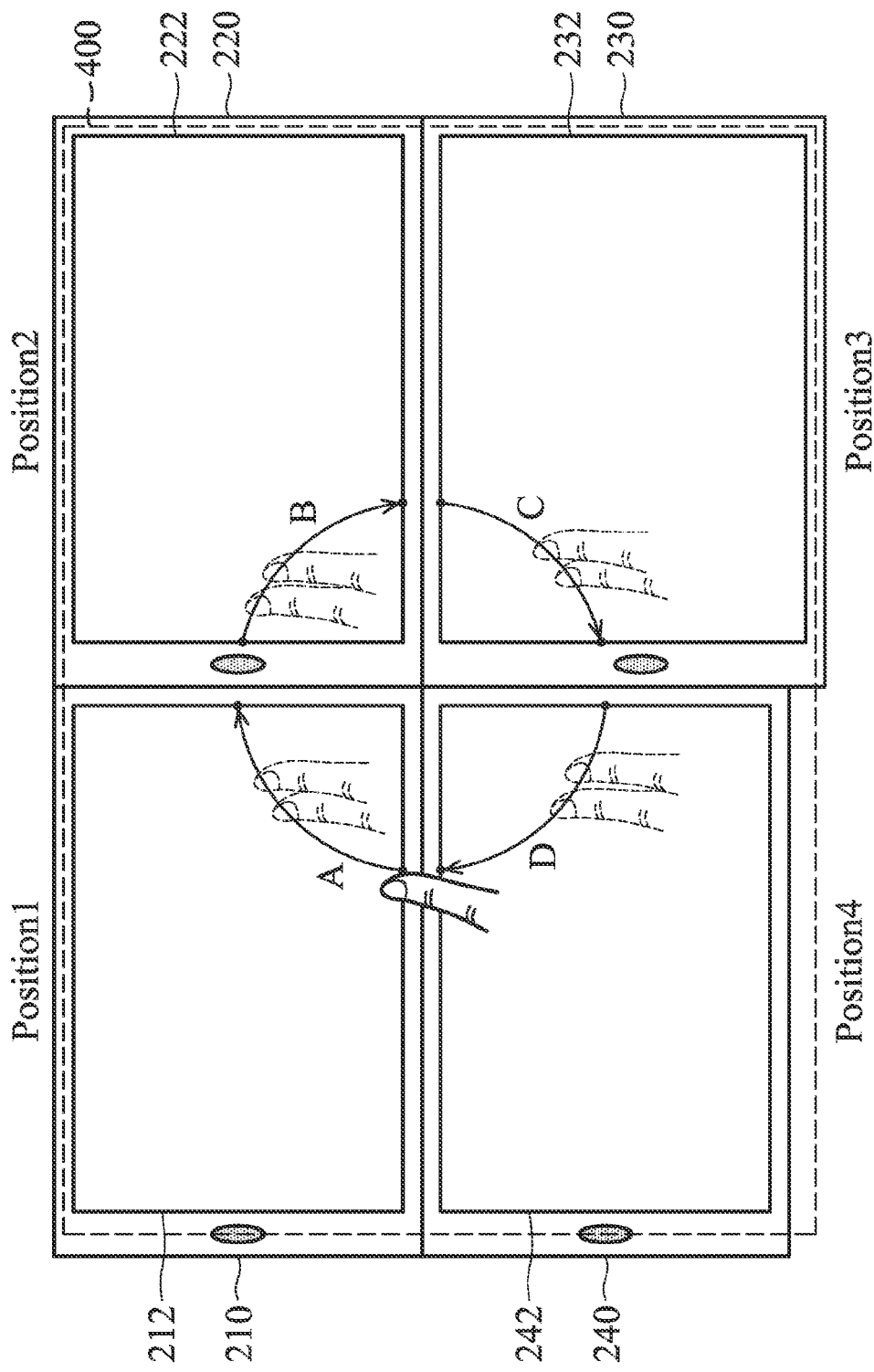
Figure 2D:
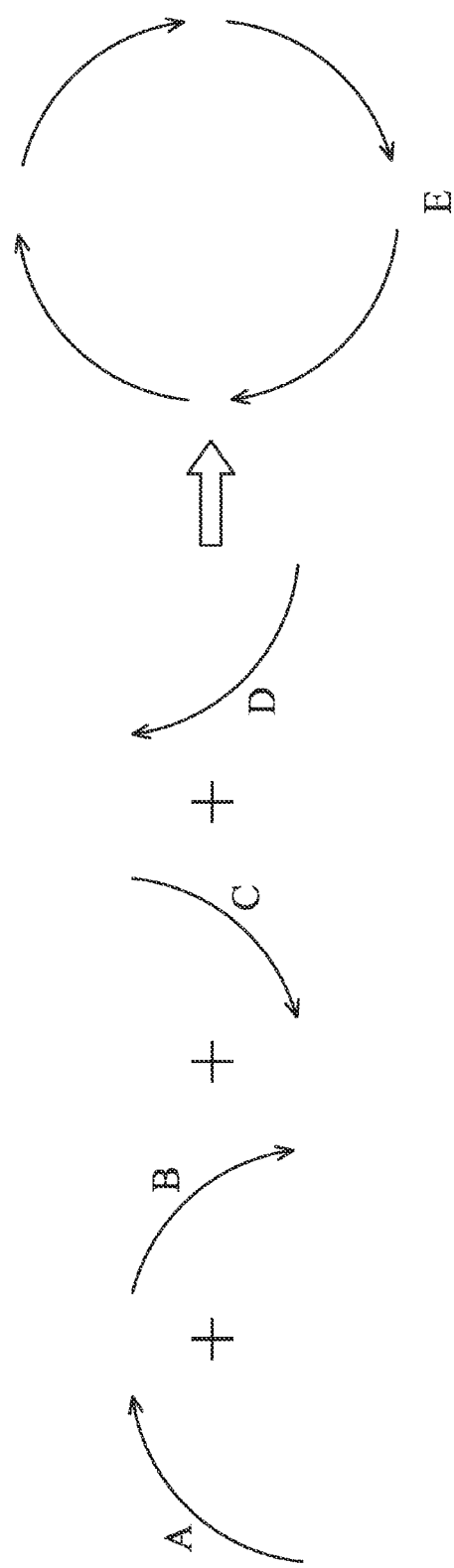

In the embodiments of the present invention, when a user attempts to perform a display sharing operation using a number of devices which are neighboring to each other and are located on the same plane, the user can issue this command by using a cross-device gesture (e.g. a circular gesture). FIGS. 2A to 2D are schematic diagrams illustrating an embodiment of an example of an operation gesture of the display sharing method of the invention. As shown in FIG. 2A, four devices 210-240 are located on positions position1, position2, position3 and position4 respectively. As the four devices 210-240 are jointly combined, these devices 210-240 are neighboring to each other and are located on the same plane. Note that the touch-sensitive display units of the devices 210-240 will form a touch-sensitive display area 400 as shown in FIG. 2B. When the user generates a circular gesture on the touch-sensitive display area 400 by their finger or the stylus, four gesture tracks A, B, C and D are generated on the touch-sensitive display units 212, 222, 232 and 242 respectively, wherein each of the gesture tracks A, B, C and D indicates a gesture contacting two edges of its touch-sensitive display unit and each of the gesture tracks A, B, C and D has a different reference vector respectively (as shown in FIG. 2C). If the gesture tracks A, B, C and D are combined together, a circular-like closed-loop gesture E can be obtained (as shown in FIG. 2C). Thus, it can be determined whether to activate the display sharing function by determining whether such closed-loop gesture can be formed.

Figure 3:
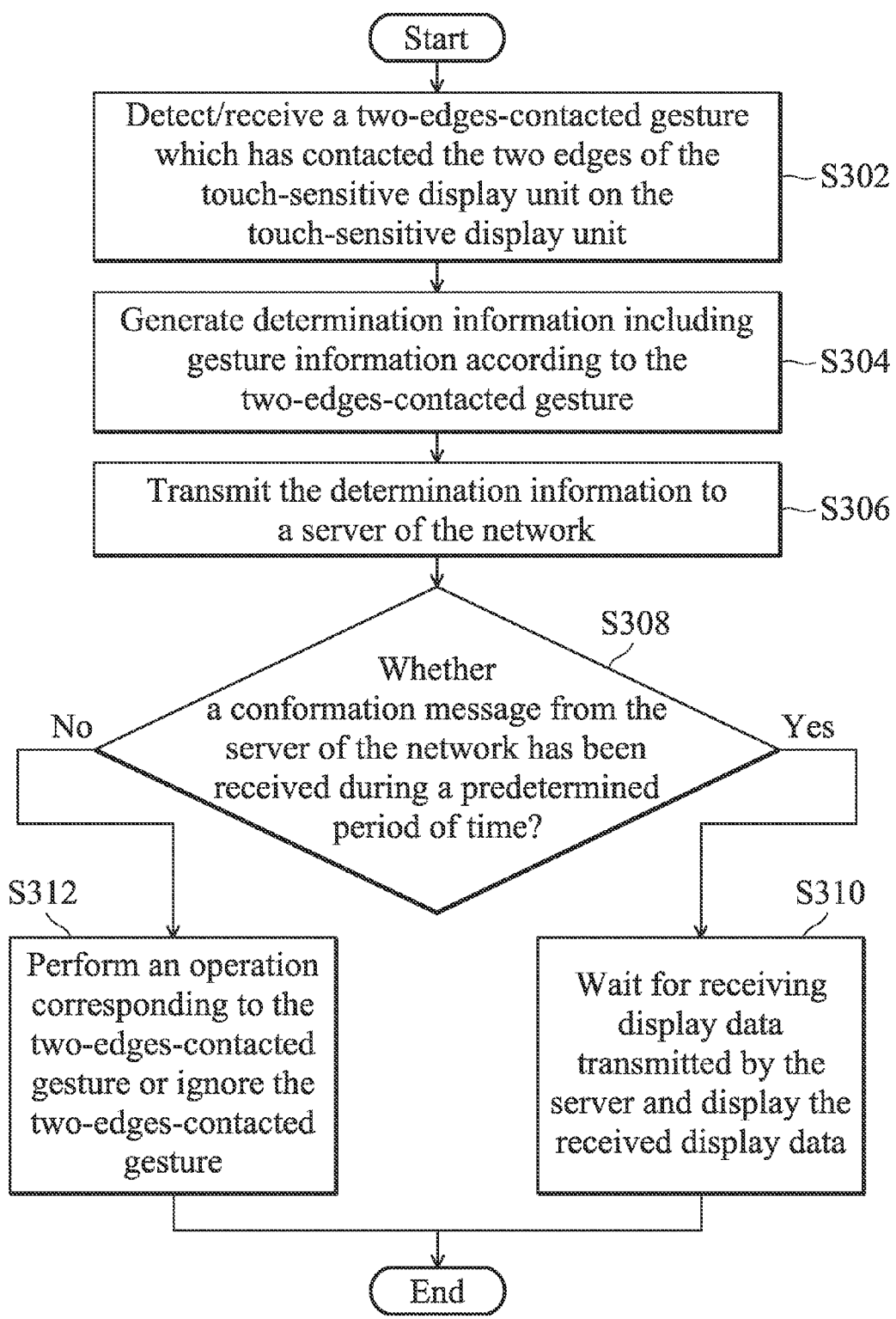
FIG. 3 is a flowchart of an embodiment of a display sharing method of the invention for use in an electronic device.

FIG. 3 is a flowchart of an embodiment of a display sharing method of the invention. Please refer to FIGS. 1 and 3. The display sharing method can be used in an electronic device, such as a portable device, e.g. a PDA, a smart phone, a mobile phone, an MID, a laptop computer, a tablet computer, or any other type of handheld device. However, it is to be understood that the invention is not limited thereto. In this embodiment, for explanation, only the device 210 applies the display sharing method is illustrated, it is to be understood that the invention is not limited thereto. Other devices 220-240 may also apply the same display sharing method.

In this embodiment, as shown in FIG. 1, the device 210 comprises a touch-sensitive display unit 212 and a processing unit 214. It is assumed that the device 210 is connected to the network 300, so that the device 210 may transmit data to or receive data from the network 300. The network 300 further includes the server 100, wherein the server 100 may contain device information (e.g. MAC/IMEI/IP information and so on) and authentication information of all of the devices 210-240. It is assumed that the user attempts to perform the display sharing operation and thus generates a circular gesture (as shown in FIG. 2C) on the touch-sensitive display area 400 formed by the touch-sensitive display units of the devices 210-240 by their finger or the stylus, wherein two edges of the touch-sensitive display units of the devices 210-240 are separately contacted by the generated circular gesture.

First, in step S302, the processing unit 214 detects/receives a two-edges-contacted gesture on the touch-sensitive display unit 212, wherein the two-edges-contacted gesture is generated by an object (e.g. a pen/stylus or finger) contacting one edge of the touch-sensitive display unit 212 and being dragged to another edge of the touch-sensitive display unit 212. To be more specific, the processing unit 214 may first detect a touch on one edge of the touch-sensitive display unit 212 and then detects that the touch is continually moving to another edge of the touch-sensitive display unit 212. Thus, the processing unit 214 detects the two-edges-contacted gesture. Note that users are able to generate the two-edges-contacted gesture via a movement of at least one object (input tool), such as a pen/stylus or finger, by dragging object from one edge to another edge of the touch-sensitive display unit 212.

After the two-edges-contacted gesture on the touch-sensitive display unit 110 is detected, the processing unit 120 may presume that the gesture may be a dedicated gesture for performing the display sharing operation and prepares to generate determination information to the server 100 for further confirmation. Thus, in step S304, the processing unit 120 generates determination information according to the two-edges-contacted gesture. For example, the determination information may at least contain device related information for the device 210 and information related to the two-edges-contacted gesture, such as a device parameter, gesture information, a location information and a reference vector parameter and so on, and it is not limited thereto. The device parameter may contain MAC address/IMEI/IP address of the device 210 and a panel length, width, thickness of the touch-sensitive display unit 212. The gesture information may contain information regarding a direction and a gesture track from the firstly contacted edge to the secondly contacted edge (such as movement detected, a starting point, an ending point, a velocity and so on of the gesture for the finger movement) to indicate a direction of the two-edges-contacted gesture caused by the finger. The location information is used for indicating a current position of the device 210. The reference vector is a vector which is perpendicular to the display plane of the device 210. In some embodiments, the reference vector may be obtained by using a set of sensors. The set of sensors may at least comprise at least one of a G-sensor, a Gyroscope and an e-compass or other direction sensors. By the sensed data provided by the sensors, a vector perpendicular to any vector on the display plane of the device 210 (i.e. the reference vector data) as well as the velocity, acceleration and other information related to the device 210 can be obtained.

After the determination information has been generated, in step S306, the processing unit 214 then transmits the determination information to the server 100 of the network 300. After the transmission of the determination information is completed, the processing unit 214 will wait for a further instruction from the server 100 of the network 300. The processing unit 214 may wait for a predetermined period of time, e.g. one minute, to wait for receiving a response from the server 100 of the network 300 based on actual requirements.

Thus, in step S308, the processing unit 214 further determines whether a conformation message from the server 100 of the network 300 has been received within a predetermined period of time.

Therefore, after the server 100 receives the determination information from the device 210, it will further wait for other determination information with the same format from other devices in the network 300. Similarly, the determination information of a device may be generated when the two-edges-contacted gesture which has contacted two edges of its touch-sensitive display unit has been detected, wherein the determination information at least contains device related information for the device and information related to the two-edges-contacted gesture. For example, when the processing unit 224 detects/receives a two-edges-contacted gesture on the touch-sensitive display unit 212, the processing unit 214 may further generate determination information corresponding thereto accordingly and transmits the determination information to the server 100.

Specially, when any of the devices controlled by the server 100 detects a two-edges-contacted gesture, it may presume that this gesture may be a dedicated gesture for performing the display sharing operation and thus generate and transmit determination information with a specific data format to the server 100 for further confirmation. After the server 100 has collected determination information from all of devices which are a set of possible matched devices via the network 300, the server 100 may perform a related combination operation or a determination operation based on contents of the received determination information, such as determining whether all of the collected determination information can be combined into a specific closed-loop gesture, whether the positions of these devices are neighboring to each other and so on, to determine whether the user has issued a display sharing command. When it is determined that a display sharing command has been issued, the server 100 transmits a confirmation message to all of the devices that the determination information correspond to and prepares to perform the display sharing operation. Detail descriptions of the determination and operation steps of the server 100 will be discussed further in the following paragraphs with reference with FIG. 4.

When the processing unit 214 receives the confirmation message transmitted by the server 100, which means that the server 100 has granted the display sharing request and thus, in step S310, the processing unit 214 waits for receiving display data transmitted by the server 100 and then displays the received display data. Meanwhile, the processing unit 214 may further prompt a query message to query for the user that whether to allow the display sharing and if allowed by the user, display the display data received from the server 100 through the touch-sensitive display unit 212.

When the processing unit 214 does not receive the confirmation message transmitted by the server 100 after the predetermined period of time has been expired (No in step S308), which means that the user has not made a request for display sharing, in step S312, it performs an operation corresponding to the two-edges-contacted gesture, e.g. rotating current displayed page, on the touch-sensitive display unit 212 or directly ignores the two-edges-contacted gesture when there is no operation corresponding to the edge movement touch since it may be an unintentional touch made by the user.

Figure 4:
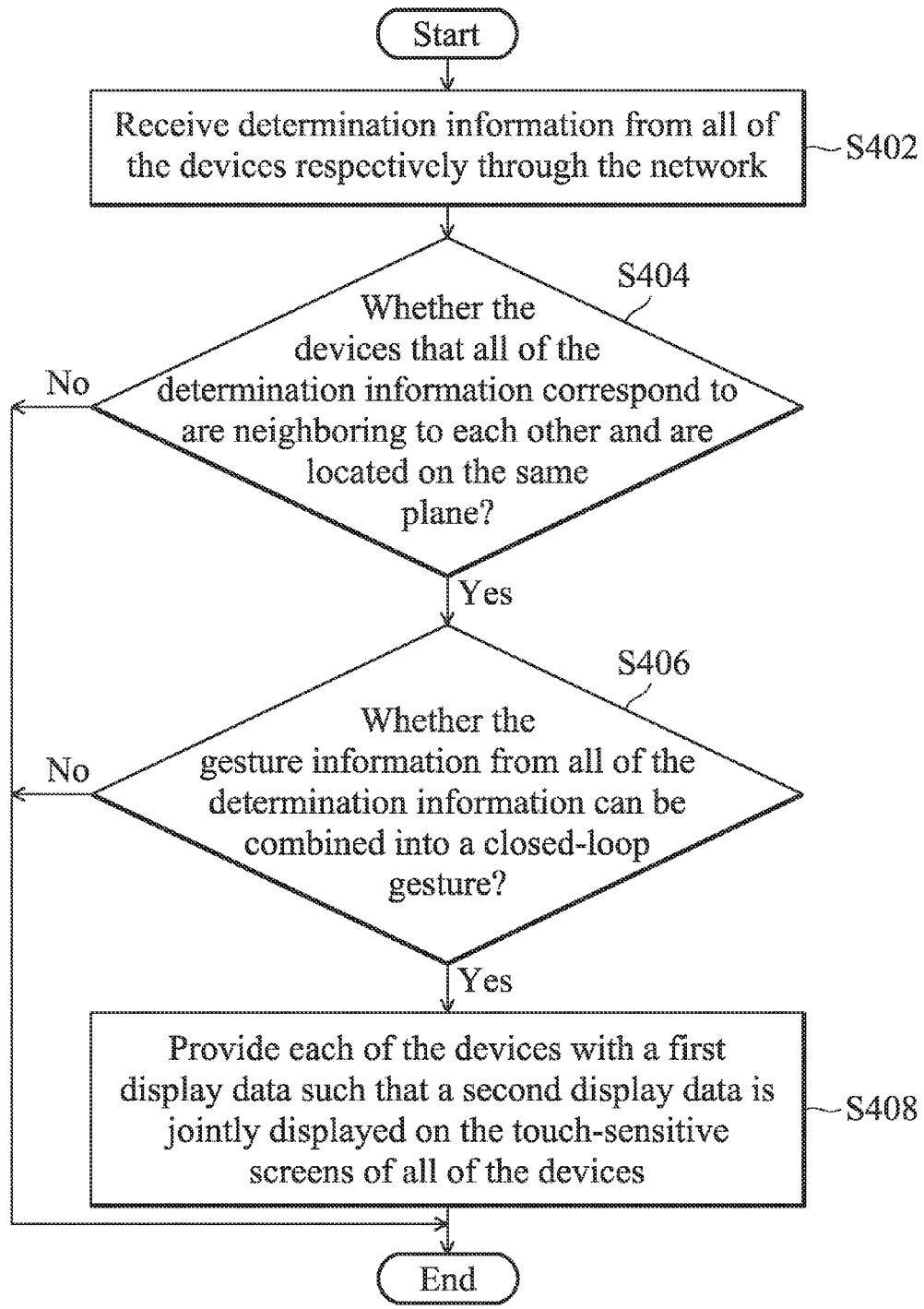
FIG. 4 is a flowchart of another embodiment of a display sharing method of the invention for use in a server of a network.

FIG. 4 is a flowchart of another embodiment of a display sharing method of the invention. Please refer to FIGS. 1 and 4. The display sharing method can be used in a server of a network, wherein the network may be any type of wired or wireless networks, such as Internet, local area network (LAN), Wireless LAN and so on. In this embodiment, it is assumed that all of the devices 210-240 are connected to the network 300, so that the server 100 may transmit data to or receive data from each of the devices 210-240 via the network 300. The server 100 may contain device information (e.g. MAC/IMEI/IP information and so on) and authentication information of all of the devices 210-240.

In this embodiment, it is assumed that each of the devices 210-240 has detected a two-edges-contacted gesture which has contacted two edges of its touch-sensitive display unit on the touch-sensitive display unit and thus generates determination information with a specific data format respectively and transmits the determination information to the server 100 for further confirmation. In step S402, the server 100 receives determination information from all of the devices 210-240 respectively through the network 300. As previously described, each of the determination information may at least contain gesture information (i.e. first gesture information), a device parameter, location information and a reference vector parameter, and it is not limited thereto. The gesture information may contain information regarding a direction and a gesture track from the firstly contacted edge to the secondly contacted edge (such as movement detected, a starting point, an ending point, a velocity and so on of the gesture for the finger movement) to indicate a direction of the two-edges-contacted gesture caused by the finger. The device parameter may contain MAC address/IMEI/IP address of the corresponding device and a panel length, width, thickness of the touch-sensitive display unit of the corresponding device. The location information is used for indicating a current position of the corresponding device. The reference vector is a vector which is perpendicular to the display plane of the corresponding device, which may further be used in determination of which plane the corresponding device has been located.

After the server 100 has completed the collection of the determination information from all of the devices 210-240, it further performs steps 404-S406 to determine whether the collected determination information represents a display sharing request. It is to be understood that, as the major concepts for determination of whether the collected determination information represents a display sharing request at least comprise following: whether the devices are neighboring to each other, whether the devices are on the same plane, and whether all of the determination information correspond to a closed-loop gesture, the server 100 may then perform the aforementioned determination separately In step S404, the server 100 determines whether the devices 210-240 that all of the determination information corresponds to are neighboring to each other and are located on the same plane. The server 100 may determine whether all of the devices that the determination information correspond to are neighboring to each other and are located on the same plane by determining whether the location information corresponding to all of the determination information are essentially the same. If not, which means that the devices 210-240 may not be located within the same area or may not close to each other, it is determined as not a display sharing request. Thus, no further determination will be performed and the comparison is ended. Contrarily, if so, which means that the devices 210-240 are neighboring to each other, the server 100 further determines whether the devices 210-240 are located on the same plane. Generally, as the reference vector data of each of the devices is a vector which is perpendicular to the display plane of the device, all of the devices can be referred to as being located on the same plane if their responsive reference vectors are all directed to a same direction or are parallel with each other. Therefore, the determination of whether the devices 210-240 are located on the same plane can be determined according to the reference vectors of the devices 210-240.

If their responsive reference vectors are not directed to a same direction and are not parallel with each other, which mean that the devices 210-240 may not be located on the same plane, it is determined as not a display sharing request. Thus, no further determination will be performed and the comparison is ended. Contrarily, if their responsive reference vectors are directed to a same direction or are parallel with each other, which mean that the devices 210-240 meet requirement of being located on the same plane, so, the server 100 further determines whether it is a specific closed-loop gesture (e.g. a circular gesture).

When determining that all of the devices 210-240 that the determination information correspond to are neighboring to each other and are located on the same plane, in step S406, the server 100 further determines whether the gesture information from all of the determination information can be combined into a closed-loop gesture. The closed-loop gesture may be defined as a gesture with a closed-loop (e.g. the gesture E shown in FIG. 2D), such as a circular gesture that is generated by the user making a circle shape which starts from point A and returns to point A by their finger (as shown in FIG. 2C). In this step, the server 100 may determine a number of possible combination orders according to all of the received determination information, sequentially combine each of the gesture information included in each of the received determination information according to each of the determined combination orders to obtain a number of combined gestures, and then determine whether any of the combined gestures forms the dedicated closed-loop gesture. It is to be noted that, the combined gestures can be obtained by combing the gesture information included in all of the determination information using any well-known mathematical models or algorithms. As it is well-known in those who are skilled in this technology and is not the main point of the invention, thus detailed descriptions are omitted here for brevity. For example, but not limited to, the server 100 may determine a number of possible combination orders according to the device information included in all of the received determination information, e.g. the panel length, width, thickness of the touch-sensitive display unit for each device, then sequentially combine each of the gesture information included in each of the received determination information according to each of the determined combination orders to obtain a number of combined gestures, and then determine whether any of the combined gestures forms the dedicated closed-loop gesture.

In some embodiments, as each of the devices may have detect the gesture which has contacted two edges of its touch-sensitive unit in different time point, the server 100 may further record a reception time that the determination information has been received for each determination information and then utilize the recorded reception time to assist in determining whether the determination information can be combined into a closed-loop gesture. In this case, the server 100 may determine a combination order according to a reception time that one of the determination information has been received for each of the determination information, obtain a combined gesture by sequentially combining each of first gesture information included in all of the received determination information according to the combination order, and then determine whether the combined gesture forms the closed-loop gesture. For example, assume that the device 210 first transmits the determination information and followed by the devices 220, 230 and 240 sequentially, the combination order can be defined as device 210→device 220→device 230→device 240. Thus, the server 100 can obtain a combined gesture by sequentially combining each of gesture information included in all of the received determination information according to the combination order. That is, the gesture information included in the determination information of the device 210 is to be the first portion of the combined gesture, the gesture information included in the determination information of the devices 220 and 230 are to be the second and third portions of the combined gesture respectively, and the gesture information included in the determination information of the device 240 is to be the last portion of the combined gesture to generate a combined gesture. Then, it is further determined whether the combined gesture is a closed-loop gesture. With the recording of the reception times for the determination information, times needed for comparison and combination can be efficiently reduced. Therefore, computational complexity for the server 100 can be significantly reduced such that the server can quickly determine whether a gesture representing a gesture for specific request.

Similarly, if the gesture information from all of the determination information can not be combined into a closed-loop gesture, it is determined as not a display sharing request and the server 100 stops the comparison. In some embodiments, after the server 100 has stopped the comparison, the server 100 may further transmit a non-acknowledge message to all of the devices to inform the determination result for them.

Figure 5A:
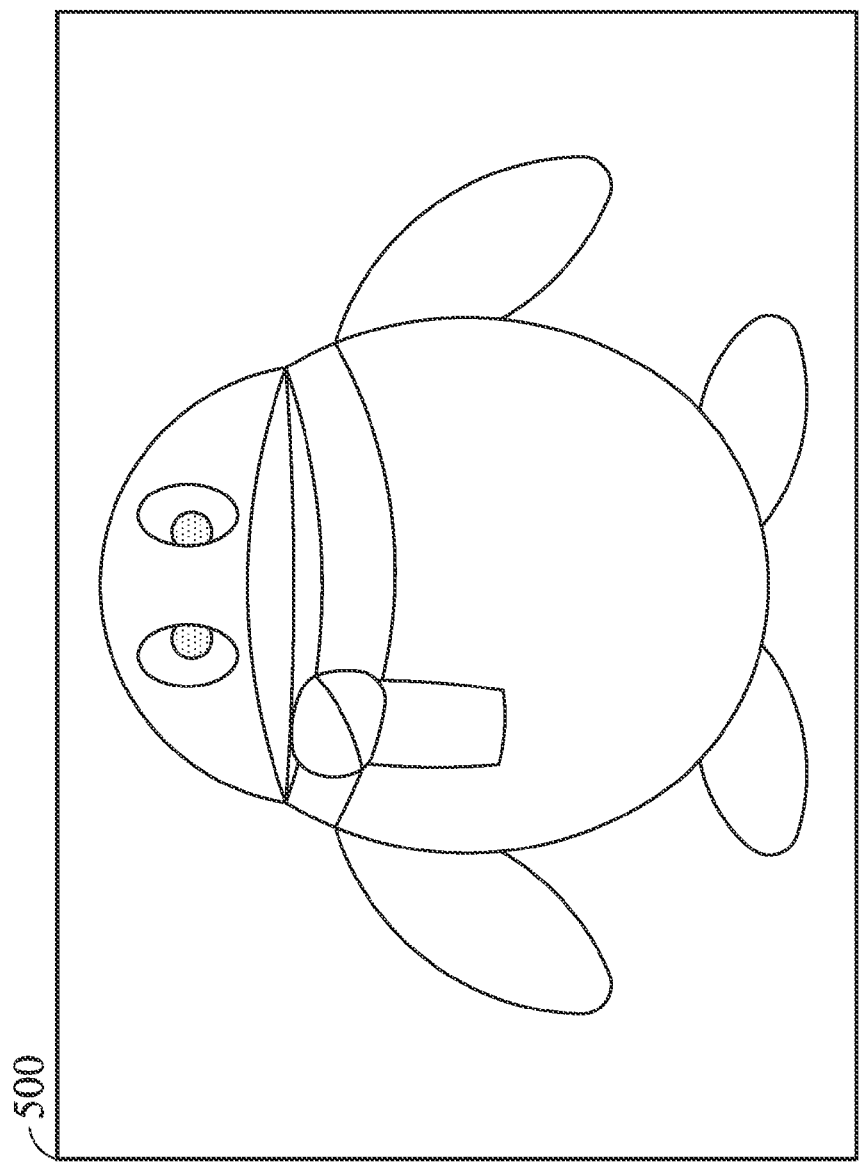
FIG. 5A is a schematic diagram illustrating an embodiment of second display data of the invention.
Figure 5B:
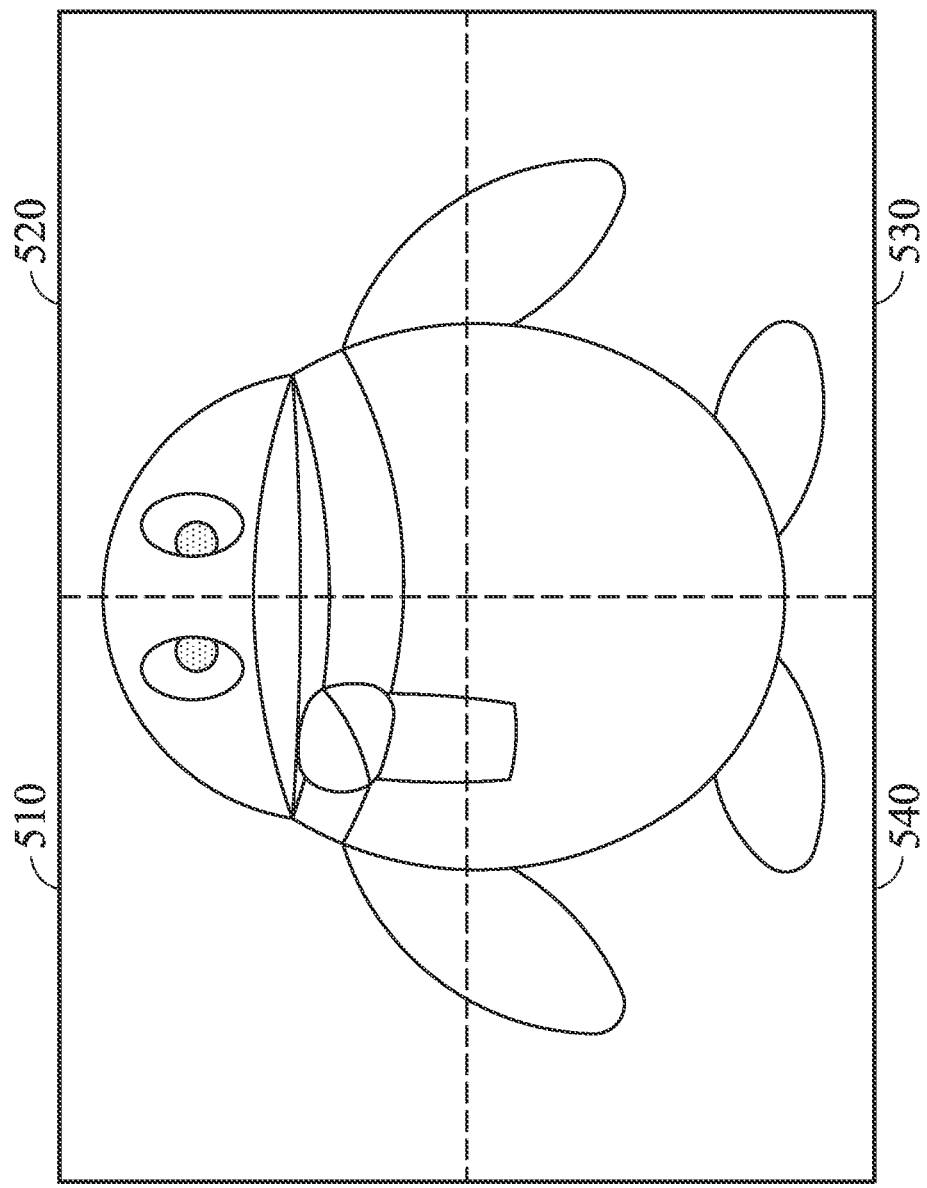
FIG. 5B is a schematic diagram illustrating an embodiment of first display data of the invention.
Figure 5C:
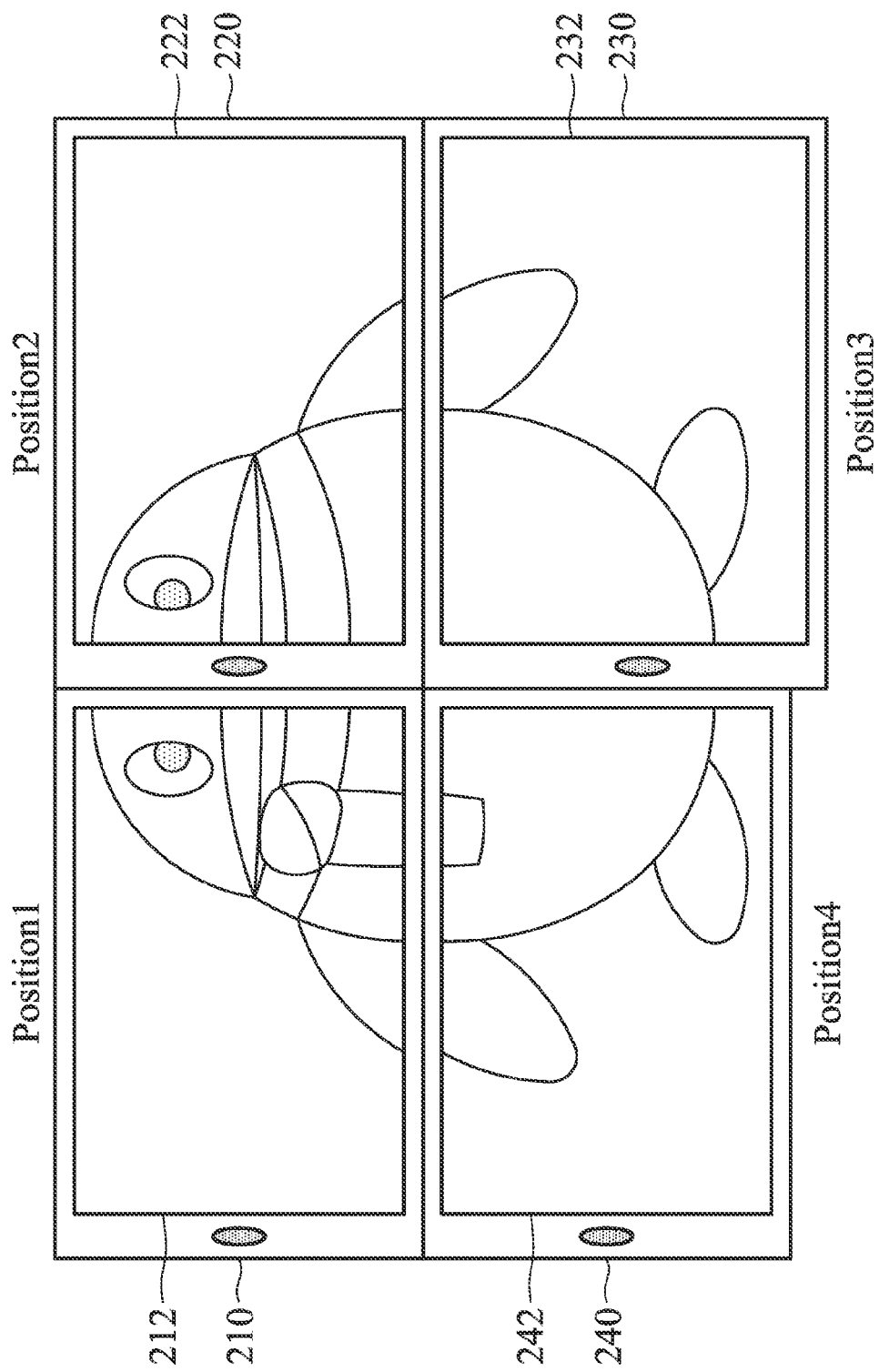
FIG. 5C is a schematic diagram illustrating an embodiment of the display sharing result of the second display data shown in FIG. 5A of the invention.

Contrarily, if the gesture information from all of the determination information can be combined into a closed-loop gesture, which means that it is a display sharing request, the server 100 prepares to perform a display sharing operation among all of the devices and transmits a confirmation message to all of the devices. In step S408, the server 100 provides each of the devices with a first display data such that a second display data is jointly displayed on the touch-sensitive display units of all of the devices. The second display data may be data stored in the server 100 or data to be displayed which is data uploaded to the server 100 by any matched device. For example, the second display data may be a picture file, an image file or a displayed screen for a specific game, but it is not limited thereto. The first display data may be a specific portion of the second display data. Particularly, the server 100 may divide the second display data into a plurality of sub-display data and then configure the first display data of each device as one of the sub-display data. For example, as shown in FIG. 5A, FIG. 5A is a schematic diagram illustrating an embodiment of a second display data 500 that is to be displayed of the invention. When determining to perform the display sharing operation, the server 100 may divide the second display data 500 into four sub-display data 510-540 (as shown in FIG. 5B) and then configure and transmit the four sub-display data 510-540 as the first display data for the devices 210-240 to the devices 210-240 respectively. Upon reception of the corresponding first display data from the server 100, the devices 210-240 respectively display the sub-display data 510, 520, 530 and 540 on the touch sensitive display units 212, 222, 232 and 242, as shown in FIG. 5C. In other words, original second display data 500 will be scaled up to be displayed on the touch sensitive display units of the four devices 210-240. Therefore, with aforementioned display sharing operation, an enlarged display area can be provided for displaying any type of data. In a specific embodiment, the second display data can be a displayed screen for a specific game and the sub-display data for displayed on each device can be related information screen for a game player, thus providing extended functions and entertainment effects for data sharing among multiple devices when multiple game players are simultaneously played.

In some embodiments, as any of the devices which are currently performing the display sharing operation may have move out of or diverge from their locking position later, the display sharing operation among them may not be continued and the server 100 should stop the display sharing operation in this case. Therefore, the server 100 may further monitor these devices to determine whether the display sharing operation should be continued.

Figure 6:
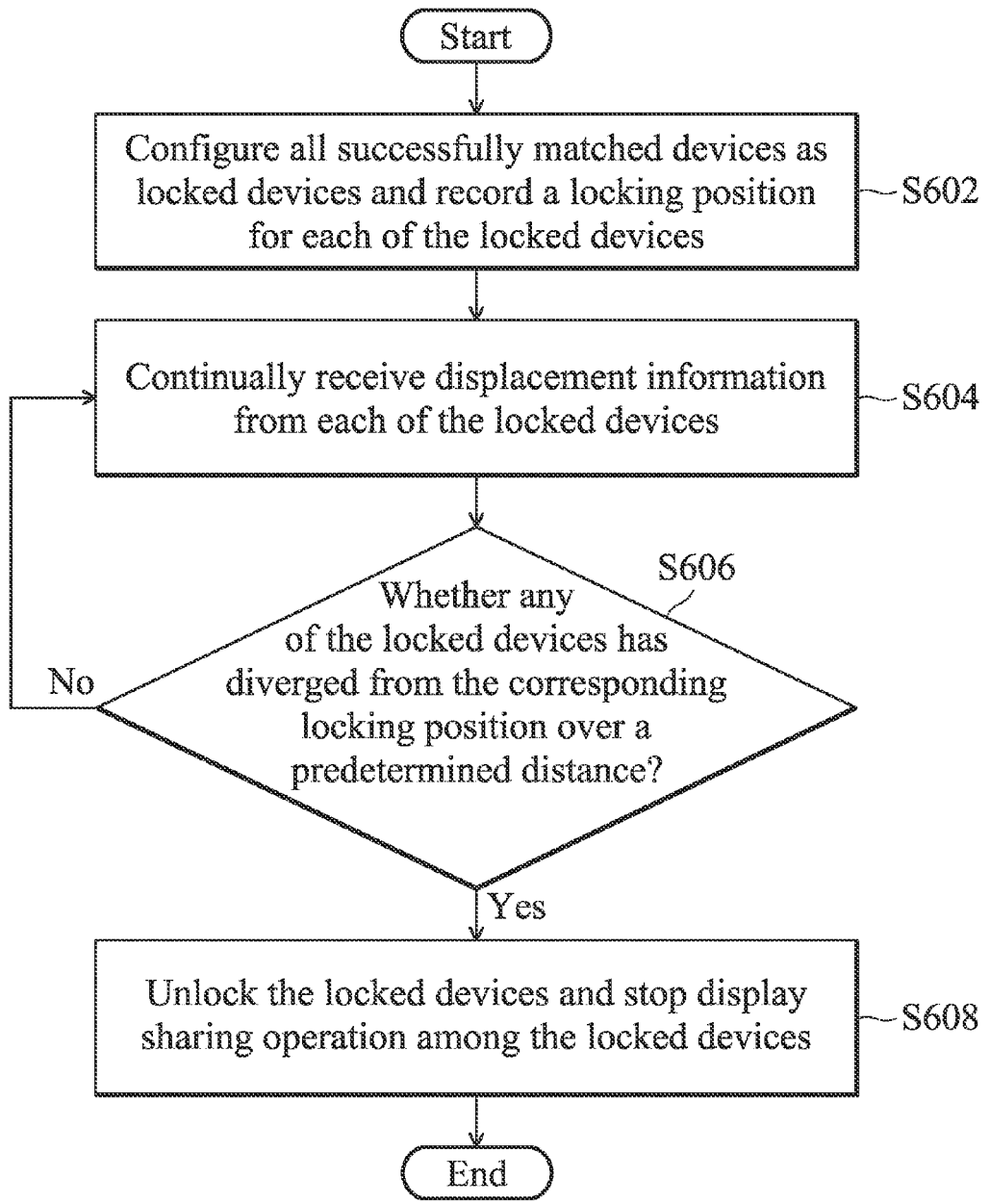
FIG. 6 is a flowchart of yet another embodiment of a display sharing method of the invention for use in a server of a network.

FIG. 6 is a flowchart of another embodiment of the display sharing method of the invention. The display sharing method of the invention can be used in a server 100 that is performing a display sharing operation among a plurality of devices. Please refer to FIGS. 1 and 6.

Figure 7A:
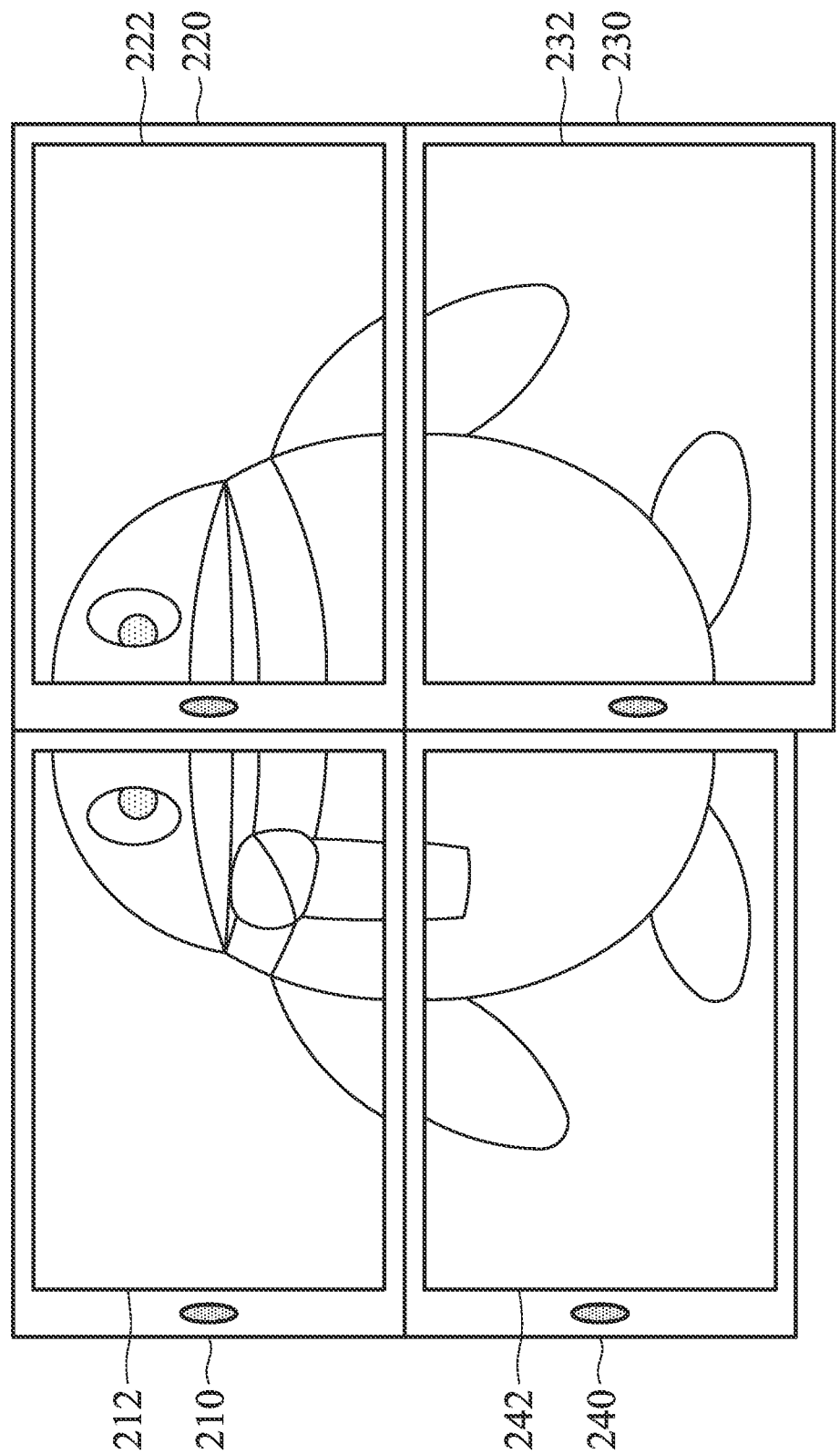
FIGS. 7A and 7B are schematic diagrams illustrating an embodiment of operations of the display sharing method of the invention, which illustrate the devices in locked state and devices left from the locked state respectively.
Figure 7B:
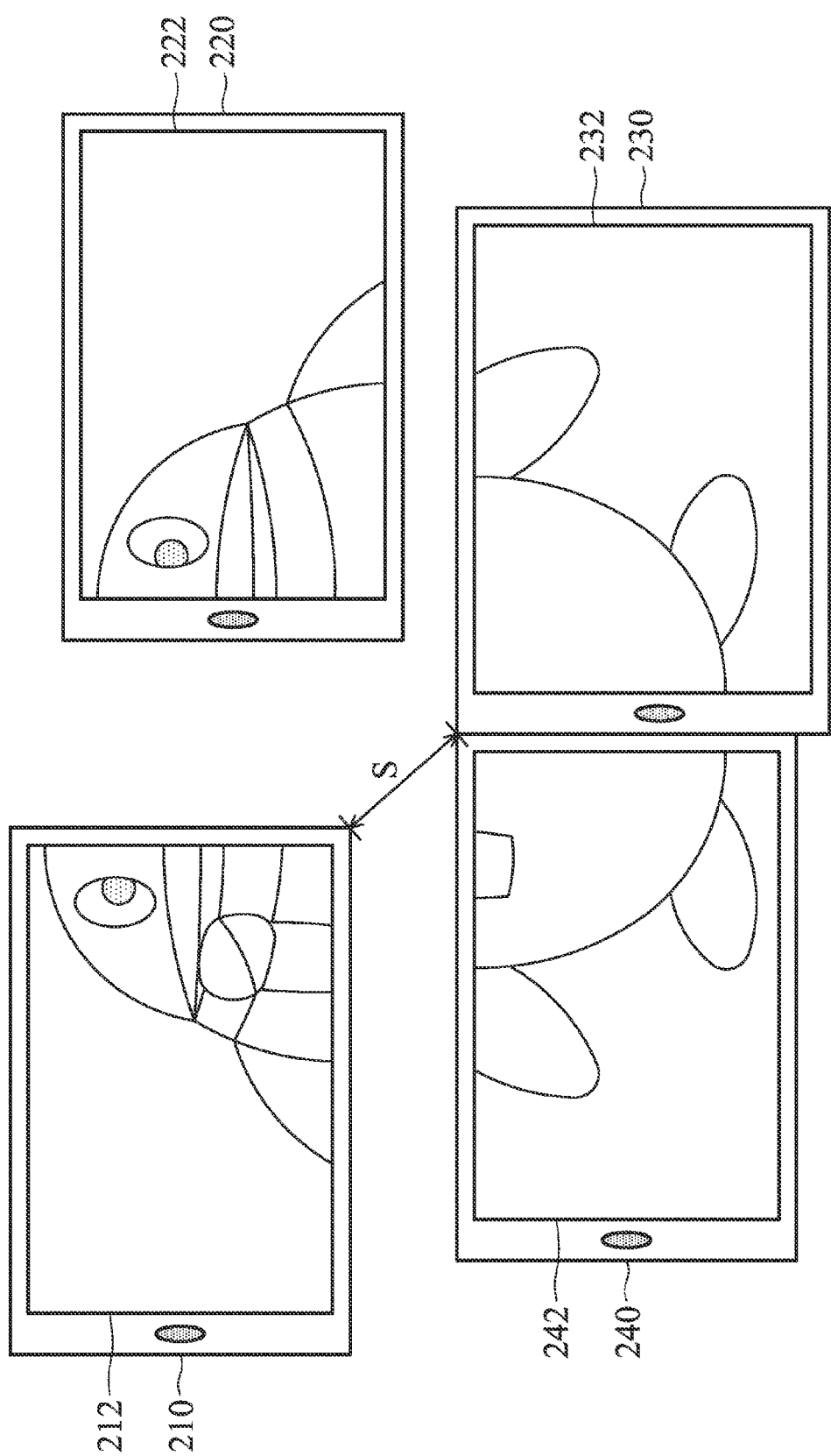

In step S602, when the server 100 starts to perform the aforementioned display sharing operation among the devices, the server 100 may configure all successfully matched devices (e.g. devices 210-240) as locked devices and record a locking position for each of the locked devices. For example, the server 100 may obtain the responsive locking position of each locked device according to the location information included in its responsive determination information, wherein the locking position for each locked device may comprise position, path and direction of which a device is locked therein. Please refer to FIGS. 7A and 7B. As shown in FIG. 7A, the server 100 configures all successfully matched devices (e.g. devices 210-240) as locked devices and records a responsive locking position for each of the locked devices. When any of the locked device has moved out from its originally locked position, an acceleration data corresponding thereto may be generated accordingly and a total movement time can also be counted at the same time (as shown in FIG. 7B). Thereafter, the displacement information can be obtained by applying the detected total movement time t, velocity $V_0$ and acceleration a on a typical distance formula (e.g. $S=V_0*t+1/2*a*t^2$). Note that the velocity and acceleration data of any device can be obtained by using positioning signal provided by a positioning device (such as GPS or any navigation systems) configured on the device and/or sensed data provided by the aforementioned sensors, such as at least one of the G-sensor, the Gyroscope and the e-compass or other direction sensors.

Then, in step S604, the server 100 continually receives displacement information from each of the locked devices, and in step S606, determines whether any of the locked devices has diverged from the corresponding locking position over a predetermined distance (e.g. has exceeded a sensible distance). In this step, when receiving displacement information from any of the locked devices, the server 100 may determine whether to unlock a locked device according to its corresponding displacement information and recorded locking position. If no displacement information of any locked device indicates that the corresponding locked device has diverged from the corresponding locking position over the predetermined distance (No in step S606), the server 100 may repeatedly perform step S604 to continually receive subsequent displacement information from each of the locked devices and make a determination. If the displacement information of any locked device indicates that the corresponding locked device has diverged from the corresponding locking position over the predetermined distance (Yes in step S606), in step S608, which indicates that the display sharing operation can not be continued any more, the server 100 unlocks the locked devices and stops the display sharing operation among them. Thereafter, the locked devices (e.g. the devices 210-240) may, upon reception on an unlock signal transmitted by the server 100, stop receiving display data from the server and restore the displayed content to that displayed prior to the locking operation has been performed. Therefore, by continually monitoring all of the locked devices, the server 100 can determine whether to continue or stop the display sharing operation among the locked devices.

In another embodiment, a display sharing method that is capable of sharing display data among devices without using a network 300 is provided for use in neighboring devices which are capable of performing short range communications and data transmissions with each other through a wireless communication protocol, such as an infra-red (IR), or Bluetooth protocol and so on. In this embodiment, assume that all of the devices 210-240 are communicated with each other through a wireless communication protocol, such as an infrared (IR), or Bluetooth protocol and so on. The devices 210-240 will first be matched to each other. Master-slave architecture is then utilized, wherein one of the devices (e.g. the device 210) is set to be a master device and other remaining devices (e.g. the devices 220-240) are set to be slave devices. The master device and the slave devices may communicate with each other through broadcasting. Meanwhile, the master device can be referred to as the same as the server 100 shown in FIG. 4 and can perform all of the operations of the display sharing methods shown in FIGS. 4 and 5 to implement the display sharing method of the invention. Note that detailed descriptions of the operations are omitted here for brevity.

Therefore, the display sharing methods and related portable devices and data transmission systems of the invention can provide entertaining data sharing methods for users, and a display sharing operation to share display data can be jointly performed among multiple devices which are neighboring to each other and are located on the same plane in the data transmission system by intuitively using closed-loop gestures, providing more extended functions for each device and increasing convenience and fun of the data sharing operation for the user. In addition, the user can intuitively issue a display sharing request to share the display data (e.g. pictures, video files and so on) among a specific number of devices by a closed-loop gesture which is a cross-device gesture crossing the specific number of devices, such that the display area can be enlarged from a small display area formed by the touch-sensitive display panel of a single device to a large display area formed by the touch-sensitive display panels of multiple devices, and thus it is suitable for displaying data of various applications, such as playing a movie or displaying displayed screens for a specific game, increasing additional values and entertainment effect on related devices.

Display sharing methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A display sharing method for use in a server which is coupled to a plurality of devices via a network, comprising:
the server receiving a plurality of determination information from the devices, wherein each of the determination information corresponds to one of the devices and comprises first gesture information;
the server determining whether all of the devices that the determination information correspond to are neighboring to each other and are located on the same plane according to the determination information;
the server determining whether the first gesture information from all of the determination information can be combined into a closed-loop gesture when determining that all of the devices that the determination information correspond to are closed to each other and are located on the same plane; and
when determining that the first gesture information from all of the determination information can be combined into the closed-loop gesture, the server providing each of the devices with a first display data such that a second display data is jointly displayed on the touch-sensitive display units of the devices,
wherein each of the determination information is generated when the corresponding device detects or receives a gesture which has contacted two edges of the touch-sensitive display unit of the corresponding device on the touch-sensitive display unit,
wherein the determination information further comprises location information, and the step of the server determining whether all of the devices that the determination information correspond to are neighboring to each other and are located on the same plane according to the determination information further comprises:
determining whether the location information corresponding to all of the determination information are essentially the same; and
if so, determining that the devices that the determination information correspond to are neighboring to each other.

2. The display sharing method of claim 1, wherein the first display data is a specific portion of the second display data.

3. The display sharing method of claim 2, wherein the second display data is further divided into a plurality of sub-display data and each of the first display data corresponds to one of the sub-display data.

4. The display sharing method of claim 1, wherein the second display data is a picture file, an image file or a displayed screen for a specific game.

5. The display sharing method of claim 4, wherein the closed-loop gesture comprises a circular gesture.

6. The display sharing method of claim 1, wherein the determination information further comprises a reference vector data and the step of the server determining whether all of the devices that the determination information correspond to are neighboring to each other and are located on the same plane according to the determination information further comprises:
determining whether the reference vector data corresponding to all of the determination information are essentially pointed to a same direction; and
if so, determining that the devices that the determination information correspond to are located on the same plane, wherein the reference vector data of each of the devices is a vector which is perpendicular to the display plane of the device.

7. The display sharing method of claim 6, wherein each of the devices further comprises a set of sensors, and the set of sensors comprises at least one of a G-sensor, a Gyroscope and an e-compass, wherein each of the devices further utilizes the set of sensors to obtain the reference vector data corresponding to each of the devices.

8. The display sharing method of claim 1, further comprising:
the server locking each of the devices and recording a locking position for each of the locked devices;
the server continually receiving displacement information from each of the locked devices; and
the server determining whether to unlock the locked devices according to the received displacement information and the locking positions of all of the locked devices.

9. The display sharing method of claim 8, further comprising:
the server determining to unlock the locked devices and stopping a display sharing operation among the locked devices when the displacement information of any of the locked devices indicates that the device that the displacement information corresponds to has diverged from the corresponding locking position over a predetermined distance.

10. The display sharing method of claim 1, wherein the step of the server determining whether the first gesture information from all of the determination information can be combined into the closed-loop gesture further comprises:
determining at least one combination order according to device information included in each of the received determination information;
obtaining at least one combined gesture by sequentially combining each of the first gesture information included in each of the received determination information according to each of the at least combination order; and
determining whether any of the at least one combined gesture forms the closed-loop gesture.

11. The display sharing method of claim 1, the step of the server determining whether the first gesture information from all of the determination information can be combined into the closed-loop gesture further comprises:
determining a combination order according to a reception time for receiving one of the determination information for each of the determination information;
obtaining a combined gesture by sequentially combining each of the first gesture information included in each of the received determination information according to the combination order; and
determining whether the combined gesture forms the closed-loop gesture.

12. A data transmission system, comprising:
a plurality of devices, wherein each of the devices at least comprises a touch-sensitive display unit; and
a server coupled to the devices via a network, receiving a plurality of determination information from the devices, wherein each of the determination information corresponds to one of the devices and comprises first gesture information, determining whether all of the devices that the determination information correspond to are neighboring to each other and are located on the same plane according to the determination information, determining whether the first gesture information from all of the determination information can be combined into a closed-loop gesture when determining that all of the devices that the determination information correspond to are closed to each other and are located on the same plane, and when determining that the first gesture information from all of the determination information can be combined into the closed-loop gesture, providing each of the devices with a first display data such that a second display data is jointly displayed on the touch-sensitive display units of the devices,
wherein each of the determination information is generated when the corresponding device detects or receives a gesture which has contacted two edges of the touch-sensitive display unit of the corresponding device on the touch-sensitive display unit,
wherein the server further determines whether the first gesture information from all of the determination information can be combined into the closed-loop gesture by determining at least one combination order according to device information included in each of the received determination information, obtaining at least one combined gesture by sequentially combining each of the first gesture information included in each of the received determination information according to each of the at least combination order, and determining whether any of the at least one combined gesture forms the closed-loop gesture.

13. The data transmission system of claim 12, wherein the server further determines whether the first gesture information from all of the determination information can be combined into the closed-loop gesture by determining a combination order according to a reception time for receiving one of the determination information for each of the determination information, obtaining a combined gesture by sequentially combining each of the first gesture information included in each of the received determination information according to the combination order, and determining whether the combined gesture forms the closed-loop gesture.

14. A portable device, comprising:
a touch-sensitive display unit; and
a processing unit, detecting a gesture which has contacted two edges of the touch-sensitive display unit on the touch-sensitive display unit, generating determination information according to the gesture which has contacted the two edges of the touch-sensitive display unit, transmitting the determination information to a server via a network, determining whether a confirmation message from the server has been received within a predetermined period of time, and receiving and displaying first display data transmitted by the server when receiving the confirmation message from the server during the predetermined period of time to jointly display second display data on touch-sensitive display units of a plurality devices which are neighboring to each other and the portable device and are located on the same plane as the portable device, wherein the first display data is a specific portion of the second display data.

* * * * *